No. 810,521. PATENTED JAN. 23, 1906.
C. M. CAGLE.
BALE TYING MACHINE.
APPLICATION FILED FEB. 23, 1905.
3 SHEETS—SHEET 2.
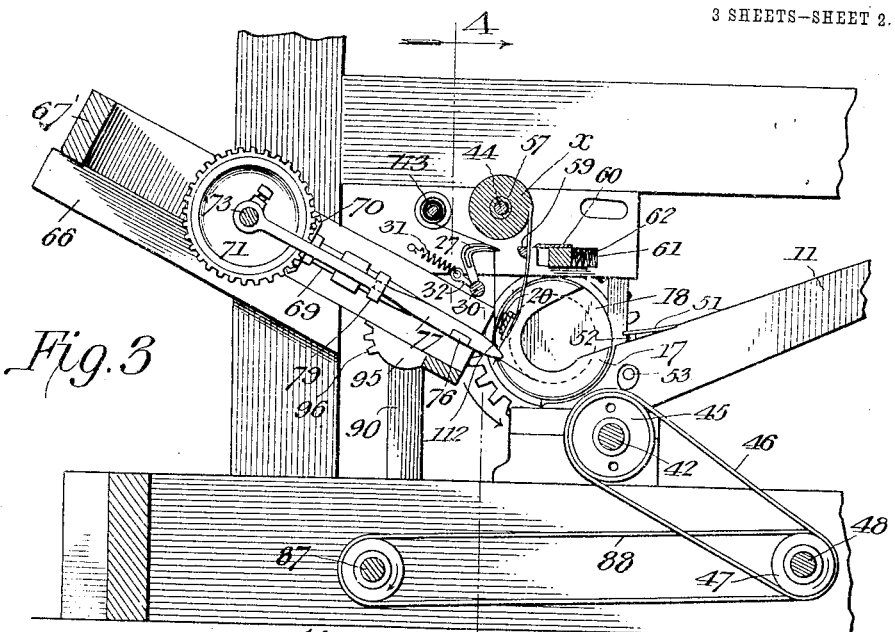
Fig.3
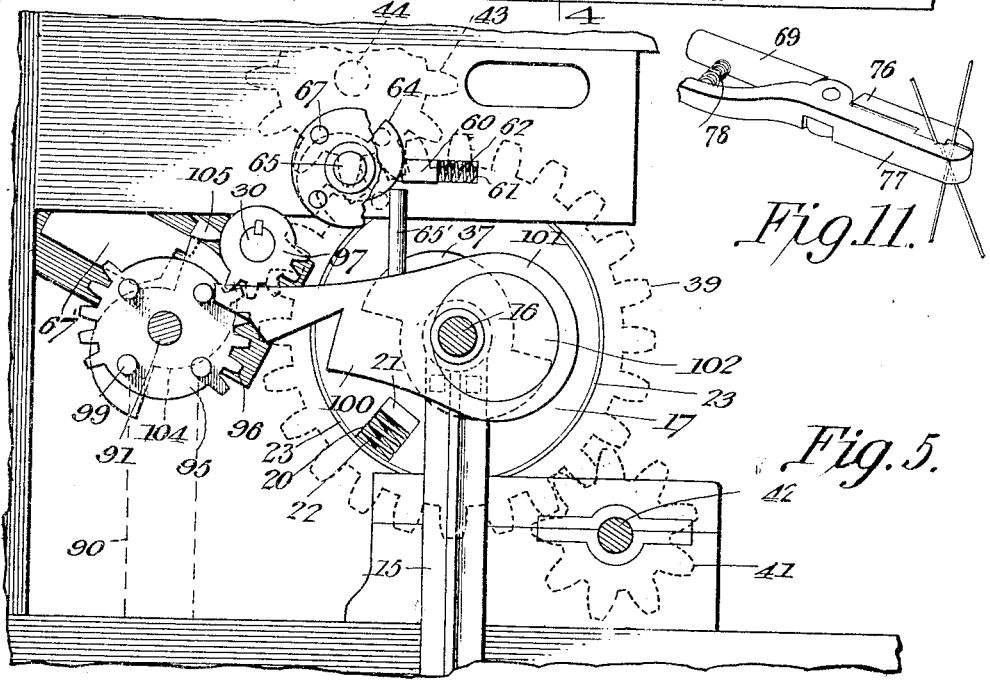
Fig.11.
Fig.5.
Fig.12.
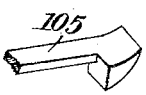
Witnesses
Carter M. Cagle,
Inventor.
by
Attorneys No. 810,521. PATENTED JAN. 23, 1906.
C. M. CAGLE.
BALE TYING MACHINE.
APPLICATION FILED FEB. 23, 1905.
3 SHEETS—SHEET 3.
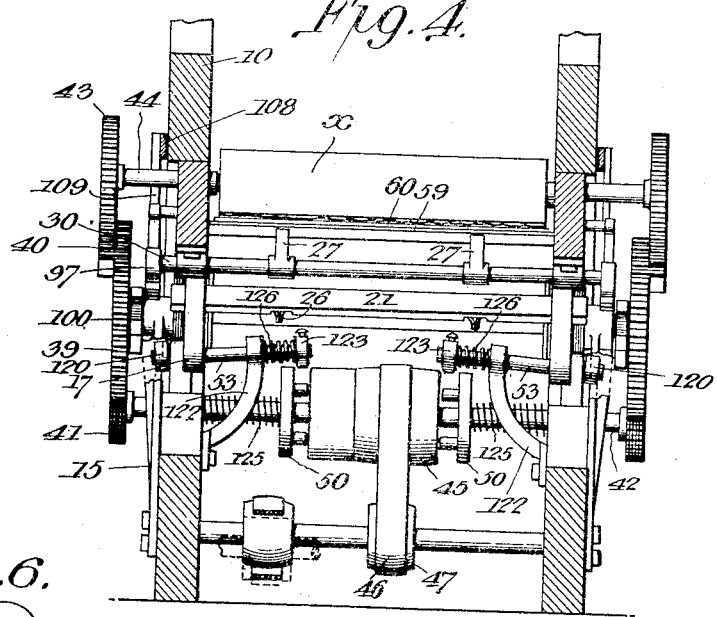
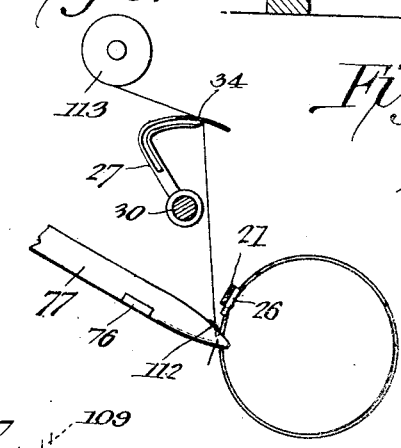
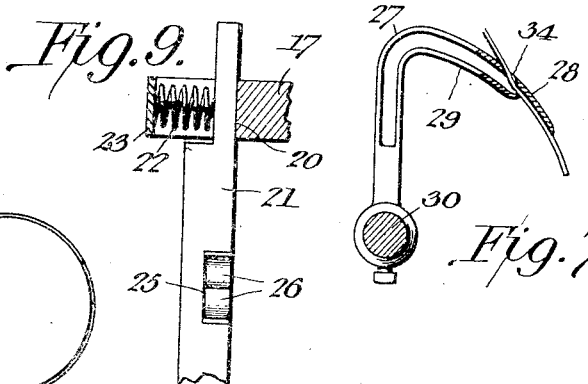
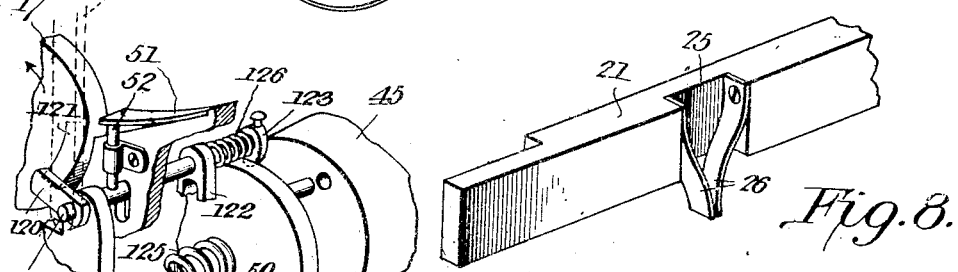
Carter M. Cagle, Inventor

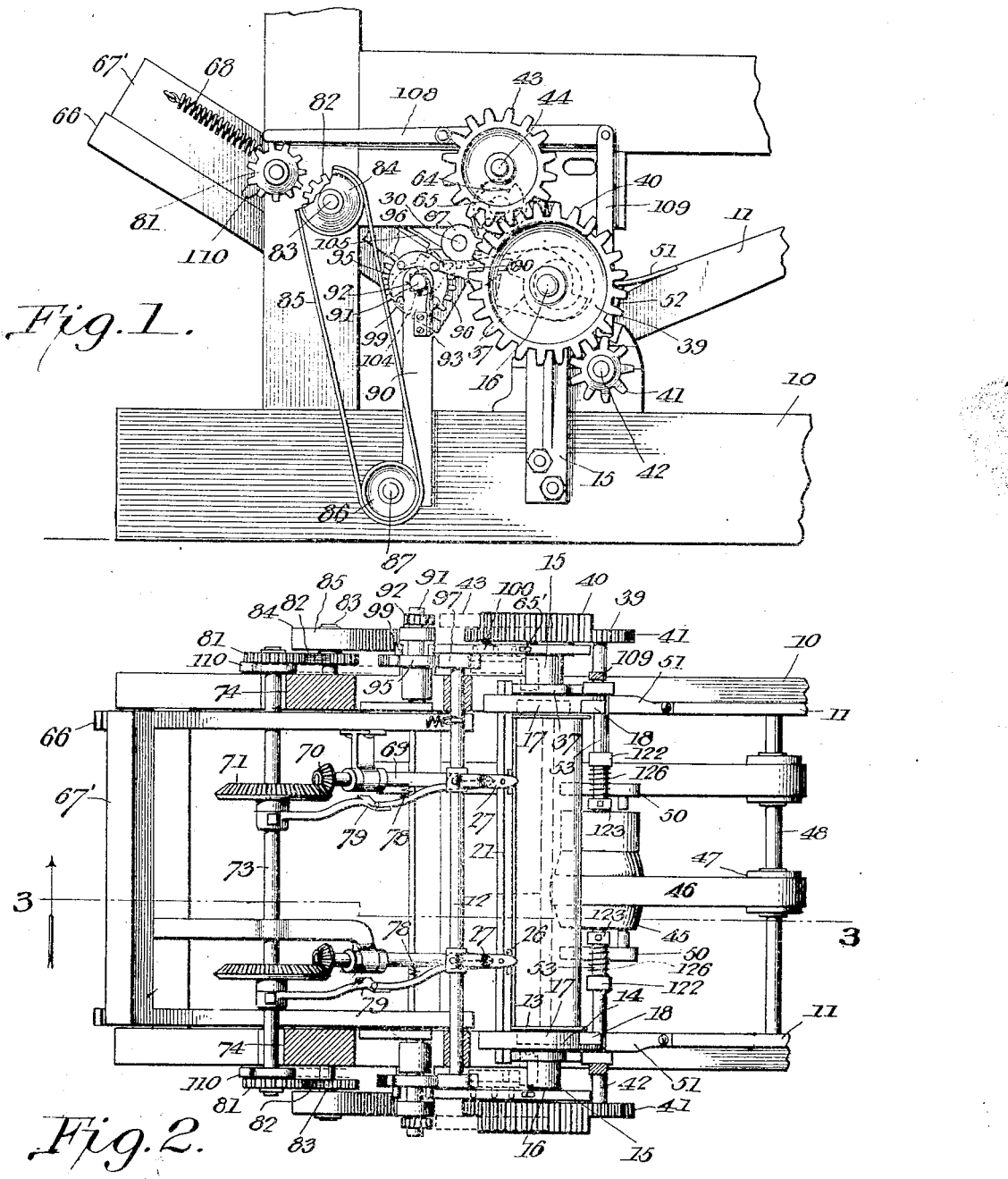

UNITED STATES PATENT OFFICE.

CARTER M. CAGLE, OF BECKVILLE, TEXAS.

BALE-TYING MACHINE.

No. 810,521.          Specification of Letters Patent.          Patented Jan. 23, 1906.

Application filed February 23, 1905. Serial No. 246,994.

*To all whom it may concern:*

Be it known that I, CARTER M. CAGLE, a citizen of the United States, residing at Beckville, in the county of Panola and State of Texas, have invented a new and useful Bale-Tying Machine, of which the following is a specification.

This invention relates to apparatus for wrapping and tying bales or bundles, and while capable of general application is intended more especially for placing wrappers of jute or other bagging material around cylindrical cotton-bales and then tying the wrappers on and holding the bale compressed by any desired number of encircling tying-wires.

The principal object of the invention is to provide a machine that will automatically wrap and tie cylindrical bales.

A further object of the invention is to construct a machine in which lengths of bagging suitable for the coverings are automatically cut from a continuous sheet or strip of bagging.

A still further object of the invention is to provide improved means for automatically passing wires around the wrapped bale, preferably during the wrapping operation, and then uniting the ends of the wires by twisting or tying the same.

A still further object of the invention is to construct a machine that will be automatically set into operation by the entrance of a bale thereinto and which will automatically effect the wrapping and tying operations and discharge the completed bale.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a side elevation of a bale wrapping and tying machine constructed in accordance with the invention. Fig. 2 is a plan view of the same. Fig. 3 is a longitudinal sectional view of the machine on the line 3 3 of Fig. 2. Fig. 4 is a transverse section of the machine on the line 4 4 of Fig. 3. Fig. 5 is an elevation of a portion of the machine drawn to an enlarged scale, the parts being shown in section. Fig. 6 is a view in the nature of a diagram, illustrating the position assumed by the parts at the completion of a single rotative movement of the heads and showing the manner in which the end of the wire is inserted in the clipping and twisting jaws. Fig. 7 is a sectional view, on an enlarged scale, of one of the needles. Fig. 8 is a detail perspective view of a portion of the wire-clamping and wrapper-engaging bar. Fig. 9 is a plan view of the same, showing one of the bale-carrying heads in section. Fig. 10 is a detail perspective view of a portion of the automatic clutch mechanism. Fig. 11 is a detail perspective view of one of the sets of twisting-jaws, showing also the wire-cutter. Fig. 12 is a detail perspective view of one of the catches for holding the twister-carrying frame elevated.

Similar numerals of reference are employed to indicate corresponding parts throughout the several figures of the drawings.

The device forming the subject of the present invention is preferably placed adjacent to or in the same frame with a cylindrical-bale-forming machine, so that it may receive bales immediately after the rolling or forming operation and place around such bales protective wrappings that are encircled by binding-wires in order to hold the wrapper in position and the bale in its compressed condition.

The working parts of the apparatus are supported in a suitable frame 10, and the previously-rolled bales are fed into the machine along a runway comprising a pair of spaced inclined bars 11. The bales are rolled on spools 12, having enlarged end flanges 13 and end disks 14 of comparatively large diameter, these disks serving as rollers that travel on the inclined trackway 11 and direct the course of the bale.

At the opposite sides of the machine are arranged vertical standards 15, each having at its upper end a bearing-opening for the reception of a threaded shaft 16, and the inner ends of said shafts are provided with disks or heads 17, having openings or recesses 18, into which the end disks 14 of the spools are received, the inclined lower wall of each recess normally assuming a position in alinement with the upper face of the runway when the parts are in the initial position, so that a bale may roll down the runway and enter the recesses or pockets. These heads are provided with radially-disposed slots 20 for the reception of the opposite ends of a transverse bar 21, that is normally pressed inward in the direction of the center of the head by springs 22, arranged between the outer end portions of the bar and strips 23 that encircle the heads. The inner face of the bar 21 is provided with recesses 25 of a number equal to the number of wires to be wound around the bale, two being shown in the present instance in order to avoid confusion, but preferably five or six wires will be used on a full-sized machine. This, however, is a matter which depends on the diameter and length of the bale, and it will be understood that where the machine is employed for wrapping and tying cylindrical articles other than cotton-bales a single wire or a plurality of wires may be employed.

In each of the slots or recesses 25 is arranged a pair of wire-gripping jaws 26, that preferably are secured at one end to the side walls of the recesses and having their opposite ends arranged to grasp and hold the end portion of the wire to be passed around the bale, the wire being introduced between these jaws through the medium of a needle 27. This needle is in the form of a pair of spring-strips 28 and 29, that may be rigidly secured to each other and to a transversely-disposed shaft 30, adapted to suitable bearings in the frame and normally held in the position shown in Fig. 3 by means of a coiled tension-spring 31, extending between a fixed point and a pin 32, carried by the shaft. The needle-strip 28 is provided with an eye 34 for the passage of the wire, while the comparatively sharp end of the inner or lower strip 29 is arranged to bear against the wire adjacent to the lower edge of the eye, so as to hold the end of the wire projected and in a convenient position to be entered between the wire clamps or carriers 26.

To the inner face of each of the standards 15 is secured a double cam 37, the cam being stationary and provided with two diametrically-opposed cam-faces with which the end portions of the clamp-bar 21 may engage as it is traveled around with the heads 17, and said clamping-bar will first be forced outward to the fullest extent to permit the ready entrance of the bale and will again be forced outward at the completion of operations to permit the release of the bale and its movement by gravity from the heads.

To the outer end of the shaft 16 is secured a gear-wheel 39, that also carries a toothed segment 40, the gear intermeshing with a driving-pinion 41 on a transversely-disposed shaft 42, and the segment intermeshing with a gear 43, carried by a transversely-disposed shaft 44. The shaft 42 carries a belt-wheel 45, that is mounted loosely on said shaft, and over the belt-wheel passes a belt 46, driven by a belt-wheel 47 on a primary shaft 48. The belt-wheel 45 is provided with a clutch-face which may be coupled to a clutching-disk 50 on shaft 42 as the bale enters the receiving-heads. For this purpose yieldable arms 51 are arranged near the lower ends of the runways and are connected by pins 52 and levers 53 to the clutching-disks, so that when the arms are moved downward by the passage of the disks of the bale-core thereover the belt-wheel will be clutched to the shaft, and movement will be transmitted to the latter and to the several parts of the wrapping and tying mechanism.

The shaft 44 carries a roller or drum 57 on which is wound a strip $x$, formed of bagging or other material suitable for covering the bales, and during the completion of each operative movement of the machine the said segment 40 will engage with and turn the gear 43 to permit feeding movement of the wrapping-strip to an extent sufficient to bring the lower end of the strip in front of the clamp-bar 21, and as soon as the bale enters it will roll directly against the strip and force the latter tightly against the clamping-bar at the beginning of the operation. The bagging is cut into lengths by a pair of cutter-bars, one of which, 59, is stationary, while the other bar 60 has its opposite ends guided in suitable slots 61, formed in the side members of the frame, and normally pressed in the direction of the stationary bar are small coiled springs 62, that are held under stress, and when released move the bar quickly in the direction of the stationary cutter and effect the severing of the bagging. To effect this operation of the cutters, a pair of double cams 64 are arranged on the outer ends of short shafts 65, carried by the frame of the machine, and from each of these cams extends an annular series of studs 67, generally four in number. These studs are engaged by a vertically-arranged lug or finger 65', that is secured to the upper portion of an eccentric-strap 101, as hereinafter described, and for each movement of the latter the cam will receive rotative movement to the extent of ninety degrees, and it therefore requires two complete rotative movements of the heads to insure a single operation of the cutting mechanism. The first of these movements is for the purpose of winding the wrapping and wire around the bale, and the second movement is for the purpose of discharging the finished bale and restoring the parts to initial position.

The frame is provided with inclined guides or supports 66 for the reception of a slidably-mounted frame 67', that also is inclined, a pair of coiled tension-springs 68 being employed to move said frame to its lowest position. This frame has supports for twister-shafts 69 of a number equal to the number of wires to be employed, and on each twister-shaft is a bevel-pinion 70, that is in constant mesh with a bevel-gear 71, secured to a transversely-disposed shaft 73, that is supported by bearings formed in the opposite side walls of the frame 67' and also extends through obliquely-disposed slots 74, arranged in the opposite side members of the frame 10. Each of the twisters includes a rigid jaw 76 and a pivotally-mounted jaw 77, the rear end of the latter being forced away from the stationary jaw member by means of a compression-spring 78, that tends to hold the gripping ends of the jaws in engagement with the wire, and the two ends of the wire are first introduced between the jaws and the latter then closed on the wire, cutting the same, and after effecting the gripping operation the jaws are rotated through the medium of the gears to intertwist the ends of said wires. The shaft 73 further carries jaw-opening cams 79 in the form of arms projecting from the shaft, and said cams engage the rear ends of the jaws and move the same to open position, this being the normal position, while the wrapper and wires are being placed around the bale. As soon as the cams move from contact with the jaws the latter close and cut and twist the wires, while the gears 71 make one complete revolution, and at the end of that time the cams engage with and open the jaws. On the opposite ends of the shaft 73 are arranged small gear-wheels 81, with which may mesh gears 82, arranged on the ends of short shafts 83, supported by the frame. These shafts 83 are further provided with belt-wheels 84, over which extend belts 85, driven from pulleys 86 on a lower transversely-extending shaft 87. This shaft 87 is connected by a suitable belt 88 and pulleys to the driven shaft 48. The frame is further provided with standards 90, having bearings for the reception of short shafts 91, on the outer ends of which are ratchet-wheels 92, with which engage pawls 93, so that the shaft may move in but one direction. The shaft carries a mutilated gear 95, having two sets of gear teeth or racks 96, that alternately engage with a mutilated gear 97 on the end of the needle-shaft 30, and at the proper time these gears will intermesh in order to turn the shaft and needle from the position shown in Fig. 3 downward until the projecting end of the wire carried by the needle is entered between the spring holding-jaws 26 of the clamp-bar, after which the gears gradually move out of mesh and the spring 31 restores the needle to its initial position. From one side of the mutilated gear 95 extends a series of pins or rollers 99—four in the present instance—and with these engages a lever 100, forming a part of an eccentric-strap 101, that is mounted on an eccentric 102, carried by the gear 39. Each complete rotative movement of the gear 39 will result in a movement of the gear 95 through an arc of ninety degrees, and it therefore requires two complete movements of the gears 39 to effect movement of one of the racks 96 into mesh with the mutilated gear 97. The shaft 91 is further provided with a double cam 104, which may engage with the lower end of the slidably-mounted frame 67', the cam forcing the frame upward against the stress of springs 68 and moving the gears 81 outward from engagement with the gears 82. When this movement has been accomplished, a spring-catch 105, carried by the main frame of the machine, will engage against the lower edge of the slidable frame and will hold the same in the elevated inoperative position, and it is not until the twister is to operate that the sliding frame is permitted to descend. This is accomplished by the engagement of the cam 104 with the inclined head of the catch 105, and when the latter is raised from engagement with the frame said frame will slide down under the influence of springs 68, and the gears 81 will again be thrown in mesh with the gears 82 to permit transmission of movement to the twister-shafts.

When the machine is set into operation, it results first in a single complete rotative movement of the gears 39 to bring the wrapper and wire around the bale. Then a dwell occurs, during which the twisters operate, and then another complete rotative movement of the gears 39 occurs in order to discharge the finished bale and restore the parts to initial position. This second rotative movement is accomplished by operating the clutch mechanism on shaft 42 through the medium of a lever 108 and link 109 from a cam 110, carried by the shaft 73.

In the operation of the machine, the parts being in the position illustrated in Fig. 3, a bale rolling down the runway 11 will enter between the heads 17, the end disks of its spool falling into the recesses or pockets 18 in said heads. Immediately preceding this the contact of the end disks with the levers of the clutch mechanism has effected the clutching of the pulley 45 to the shaft 42, and the heads revolve, carrying with them the bale. The weight of the bale causes the clamp-bar 21 to move outward against the stress of springs 22, so that the hanging end of the wrapper is caught between the periphery of the bale and the clamp-bars and is firmly held in position, while the binding-wires have been previously introduced to the catches 26. As the movement progresses in the direction indicated by the arrow, Fig. 3, the wrapper and wires will be wound around the bale, and during this first rotative movement the bale and core are held in proper position within the heads by the wrapping material and the wires, there being sufficient frictional resistance to the movement of the latter to prevent the falling of the bale. The operation continues until one of the shoulders of the cam 64 passes beyond the knife-carrying bar 60, whereupon springs 61 force the movable bar in the direction of the stationary bar 59 and sever the partly-wound strip, the severed length being just sufficient to cover the bale. As the operation continues the clamp-bar will gradually assume the position shown in Fig. 3, with the end of the wire projecting from the clamping-jaws in a position in alinement with the twisters, and when this occurs the parts will automatically stop for an instant. The latter part of the movement has forced one of the shoulders of cam 104 against the catch 105 of the twister-frame, and when the latter is released it moves down under the influence of springs 68, carrying with it the several twisters, which in moving forward are so arranged that the crossed wire will be entered between the outer ends of the jaws, and the upper portions of said jaws are provided with clippers 112, which, however, engage only with that portion of the wire between the upper faces of the jaws and the wire-reel 113. This movement causes the gears 81 to engage with the revoluble gears 82, and movement is transmitted to the shaft 73. As soon as this occurs the cams 79 move from contact with the rear ends of the movable jaws, and the latter then close on the wire and immediately severing the upper portion of the wire start the twisting operation. The diameters of the gears 71 with relation to the diameters of the pinion 70 is such that for one complete rotative movement of the shaft 73 the twisters will be rotated, say, four times, this being ample to secure a perfectly strong twist. Near the completion of movement the cam 110 again engages the lever 108 and causes the clutching mechanism of pulley 42 to again become operative, and movement will once more be transmitted through the gears 41 to the gears 39. At the completion of movement of the twisters the cams 79 have engaged and opened the jaws, so that the wire is released, and shortly after the beginning of the movement of the gears 39 the ends of the clamp-bar will ride over one of the shoulders of cam 37 and being forced outward will relieve pressure on the bale, so that the latter is free to fall from the pockets 18. The parts, however, continue to move until the heads 17 have fully completed a second revolution and all the parts are restored to initial position. During the latter part of the movement of the gears 39 the gear-sections 40 have engaged with the teeth of gears 43 and a quantity of the wrapping-strip is fed downward in position to pass in front of the clamping-bar. This movement also forces the frame of the twisters upward and backward, and one of the sets of gear-teeth 96 engages the mutilated gear 97 and turns the needle and needle-shaft until the end of the wire is again inserted between the jaws 26.

The clutch-operating levers 53, previously described, are provided at their outer ends with arms 120, that are arranged to be engaged by cams 121, carried by the outer faces of the heads 17, and the inner portions of said arms pass through brackets 122, carried by a fixed frame and are provided with rigid collars 123, that are adapted to engage with the clutch-disks 50 and move the same from engagement with the ends of the belt-wheel 45 against the stress of springs 125, that surround the shaft 42. The levers 53 carry compression-springs 126, which extend between the collars 123 and brackets 122 and serve to move the lever 53 endwise when the cams 121 are disengaged from the arms 120. The operation of this portion of the machine is such that each time a bale engages the members 51 pins 52 will be depressed and move the outer ends of the arms 120 to a position below the cams 121, whereupon the springs 126 will move said levers 53 forward and permit the springs 125 to force the clutch-disks 50 into engagement with the clutch-faces of the pulley 45. The parts will then rotate, heads 17 moving in the direction of the arrow, Fig. 10, until the cam 121 engages the arm 120 and by moving the same outward causes collar 123 to engage clutch-disk 50 and move the same from engagement with the clutch-face 45, thus immediately stopping the operation of the machine, and this occurs once at each complete rotation of the heads 17. At the completion of the first revolution the tying and twisting mechanism starts into operation, and at the completion of this cam 110 raises lever 108 and by depressing the arm 109 again forces the arm 120 out of contact with the cam 121, and the operation proceeds as before until the finished bale moves from between the heads and the latter continue on their movement until they again assume the initial position.

Having thus described the invention, what is claimed is—

1. In binding apparatus, means for pressing one end of a binding-wire against the article to be bound, means for turning the article to wind the wire therearound, and means for intertwisting the ends of the wire.

2. In binding apparatus, means for simultaneously turning the article and carrying a binding-wire therearound, so that the wire encircles the article, and means for intertwisting the ends of the wire.

3. In binding apparatus, a revoluble support for the reception of the article to be bound, means movable with the support for engaging one end of a wire, means for simultaneously turning the support carrying the wire-engaging means, thereby to wind the wire around the article, and means for intertwisting the ends of the wire.

4. In binding apparatus, a revoluble support for the article to be bound, a wire-clamp carried by the support, and means for clipping the wire after being wound about the article, and for twisting the meeting ends of said wire.

5. In wrapping and binding apparatus, means for simultaneously winding a wrapper and a binding-wire around the article to be bound, and means for twisting the ends of the wire.

6. In binding and wrapping apparatus, means for turning the article to be bound, means for engaging a wrapper and means for engaging the tie-wire and carrying the same around with the article, and means for intertwisting the ends of the tie-wire.

7. In wrapping and binding apparatus, an article-supporting means, means for clamping the end of a wrapper and the end of a tie-wire against the article, means for revolving the support to effect the winding of the wrapper and tie-wire around the article, and means for uniting the ends of the tie-wire.

8. In apparatus of the class described, an article-support, means for clamping one end of a wrapper-strip against the article, means for revolving the article to inclose the article in the wrapper, and means for severing the wrapper-strip into wrapper lengths.

9. In apparatus of the class described, an article-support, means for clamping one end of a wrapper-strip against the article, means for turning the support to envelop the article in the strip, and means for severing the strip into wrapper length in advance of the completion of the enveloping operation.

10. In apparatus of the class described, a revoluble article-support, means for clamping one end of a wrapper-strip against the article and for holding the end of the tie-wire against the wrapper-strip, means for turning the support to encircle the article by the wrapper and tie-wire, means for severing the wrapper-strip into a wrapper-length in advance of the completion of the turning movement, means for subsequently severing the tie-wire, and means for intertwisting the ends of the tie-wire.

11. In apparatus of the class described, a pair of revoluble heads recessed for the reception of the ends of a cotton-bale core, a clamp-bar carried by the heads, a wire-clamp supported by the bar, springs tending to force the clamp-bar inward to engage the periphery of the bale, means for feeding the end of the wrapper-strip against the inner face of the clamp-bar, means for introducing the end of a wire to the wire-clamp, means for turning the heads to effect the encircling of the bale by the wrapper-strip and tie-wire, means for severing the wrapper-strip into a wrapper length in advance of the completion of the turning movement, means for subsequently severing the wire into a binding length, and means for intertwisting the ends of said wire.

12. The combination with a pair of revoluble heads having recesses for the reception of the ends of a bale-core, of a clamp-bar extending between the heads, a wire-clamp carried by the bar, means for introducing the end of a wire into the clamp, means for feeding the end of a wrapper-strip in front of the bar, springs tending to force the bar into contact with the periphery of the bale, normally-locked actuating means for the carrier, means operable by the bale for unlocking the operating means, means for cutting the wrapper-strip and means for cutting the wire, and means for intertwisting the ends of the wire.

13. In apparatus of the class described, a wire-clamping member, means for introducing the end of the wire thereinto, means for turning the article and the clamping member, twisting and severing jaws through which the wire runs during the wrapping operation, said clamp serving to direct the end of the wire between said jaws after the wrapping operation, means carried by the jaws for severing the wire into lengths, and means for turning said jaws to twist the ends of the wire.

14. In apparatus of the class described, a needle formed of a pair of spring-arms, one of which is provided with an eye for the passage of the wire, the second arm being arranged to engage with the wire at a point beyond the eye and to hold the wire projected from the needle.

15. In apparatus of the class described, a needle comprising a pair of arms, one of which is yieldable with respect to the other, one of said arms having an eye for the passage of the wire, and the other being arranged to engage and clamp the wire at a point beyond the eye.

16. In apparatus of the class described, a pair of clamping-jaws having wire-severing means, a movable frame carrying the jaws, means normally maintaining the jaws in open position for the reception of the wire, a revoluble wire-carrier arranged to pass the wire around the article to be bound, to hold the wire in front of the jaws, means for advancing the frame and jaws, and gears movable into mesh on forward movement of said frame and adapted to revolve said clamping-jaws and twist the wire.

17. The combination with a pair of revoluble heads having recesses for the reception of a cotton-bale core, of a driving-shaft normally uncoupled from the heads, means for placing the wire around the bale, and means operable on the passage of the bale into said recessed heads for clutching the head to the shaft.

18. The combination with a pair of heads recessed for the reception of a cotton-bale core, of a driving shaft normally uncoupled from the heads, means for passing a tie around the bale as it is revolved by the heads, means for uniting the ends of the tie, a runway for introducing a bale into the heads, and means operable by the passage of the bale along the runway for connecting the shaft to the heads.

19. The combination with a pair of heads recessed for the reception of the ends of a cotton-bale core, of a driving mechanism normally disconnected from the heads, means for automatically connecting the heads to the driving means as the bale-core enters said heads, means for passing a tie around the bale as it revolves with the heads, means for automatically stopping the heads at the completion of each revolution, means for uniting the ends of the tie-wire at the completion of the first revolution of the head, and means for automatically starting a second revolution of the heads after the completion of the tie-forming operation.

20. In a bale wrapping and tying mechanism, a pair of revoluble heads recessed for the reception of the ends of a bale-core, automatic means for enveloping the bale in the wrapper and for passing a tie-wire around the wrapper and bale, said bale being held within the recess during a portion of the travel of the heads by means of the wrapper and wrapper-holding devices, means for severing the wrapper-strip, in advance of the completion of the enveloping operation, and means for effecting the automatic discharge of the completed article from the machine.

21. In a machine of the class described, the combination with a pair of revoluble heads recessed for the reception of the ends of a bale-core, of a driving-shaft, a pair of clutching members mounted thereon, a clutch-operating lever, a runway, means on the runway disposed in the path of the entering bale, and connected to the clutch-operating arm, and means for automatically disconnecting the clutch at the completion of each revolution of the heads.

22. In bale-tying mechanism, a pair of twisting-jaws, gearing connections therefor, a slidable frame carrying the jaws, a cam for engaging and moving the frame to inoperative position, and means for advancing the frame to operative position.

In testimony that I claim the foregoing as my own I have hereto affixed my signature in the presence of two witnesses.

CARTER M. CAGLE.

Witnesses:
B. F. CARPENTER,
C. A. BARRON.